Jan. 12, 1937.     I. A. MORRIS     2,067,408

APPARATUS FOR CLEANING WELLS

Filed March 15, 1935     2 Sheets—Sheet 1

Inventor
Ira. A. Morris

By Hardway Cathey
Attorneys

Jan. 12, 1937.   I. A. MORRIS   2,067,408
APPARATUS FOR CLEANING WELLS
Filed March 15, 1935

Inventor
Ira A. Morris

Patented Jan. 12, 1937

2,067,408

UNITED STATES PATENT OFFICE 2,067,408

APPARATUS FOR CLEANING WELLS

Ira A. Morris, Fort Worth, Tex., assignor to Paul R. Robb, Duncan, Okla.

Application March 15, 1935, Serial No. 11,340

5 Claims. (Cl. 102—4)

This invention relates to an apparatus for cleaning wells, particularly oil wells.

An object of the invention is to provide an apparatus of the character described that may be lowered into a well and/or into the screen set therein and which has been especially designed for the purpose of cleaning the screen and relieving the congestion in the formation about the screen, or for opening up the congested walls of the bore in cases where no screen is used, to permit the free inflow of fluid such as oil into the screen or bore, and thence to the ground surface.

Another object is to provide an apparatus of the character described which may be used without injury to the screen or bore.

It is a well known fact that in the production of oil, a screen is usually set in the oil bearing strata beneath the casing to exclude the sand and other detritus, and to permit the inflow of the oil into the screen. It is also a well-known fact that paraffin and other clogging material at times clogs or partially clogs the screen and restricts or entirely prevents inflow of the oil. It is also a well known fact that the formation about the screen often packs in such manner as to prevent or restrict the flow of oil through the formation to the screen; in case a screen is not used, the walls of the bore may become clogged so as not to permit the inflow of oil into the bore. It is the prime object of this invention to provide means for unclogging the clogged screen in a well bore as well as for relieving the congestion of the formation about the bore.

With the above and other objects in view, the invention has particular relation to certain novel features of construction, operation, and arrangement of parts, an example of which is given in this specification, and illustrated in the accompanying drawings, wherein.

Figure 1:
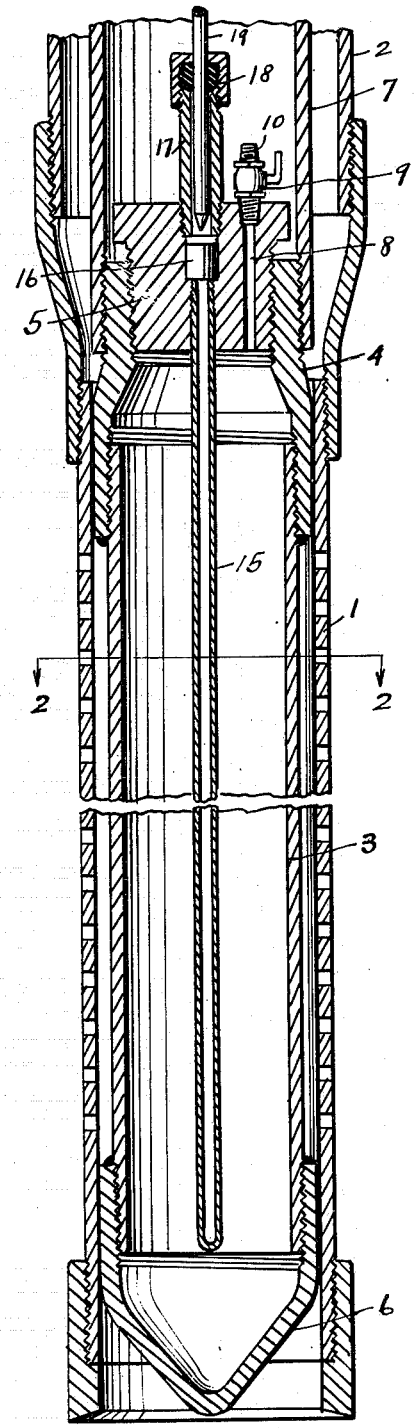
Figure 1 shows a vertical sectional view of a well screen with the apparatus therein.
Figure 2:
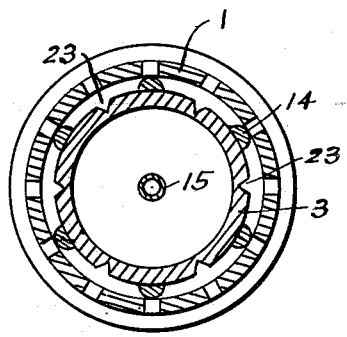
Figure 2 shows a cross-sectional view taken on the line 2—2 of Figure 1.
Figure 3:
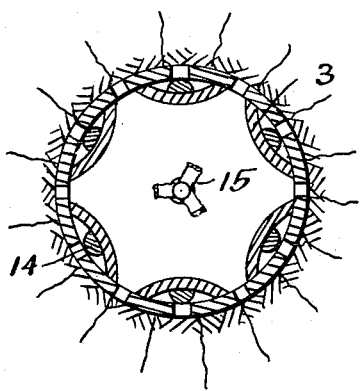
Figure 3 shows a cross-sectional view of the apparatus after the explosion of the charge has taken place.

In the drawings, the numeral 1 designates the well screen as set in the well bore and attached in any preferred manner to the lower end of the well casing 2. This screen usually consists of a length of perforated pipe, although the screen may be of any conventional form. The numeral 3 designates a tubular container whose upper end may be closed by the nipple 4, and the plug 5 screwed into said nipple, and whose lower end may be closed by the guide 6.

Figure 4:
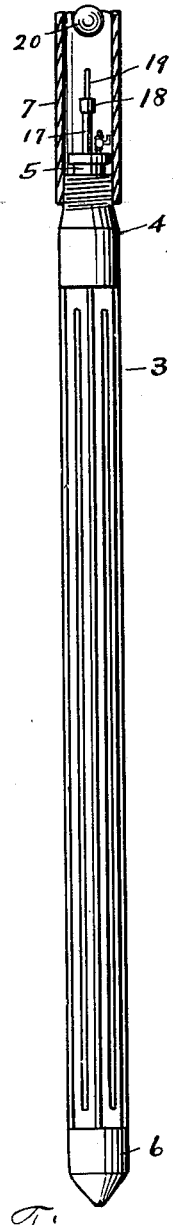
Figure 4 shows a side elevation of the apparatus.

The numeral 7 designates a tube to the lower end of which the container 3 is attached, and by means of which it may be let down into the screen from the ground surface, as indicated in Figures 1 and 4. The container 3 may be filled with an explosive charge, preferably an explosive gas which may be introduced into the container through the inlet duct 8 which may be opened and closed by the valve 9. This valve has a connection 10 for the attachment of a filling hose thereto, and the explosive charge may be introduced into the container 3 while the valve 9 is opened, and said valve then closed to retain said charge, and the filling hose then detached.

Figure 5:
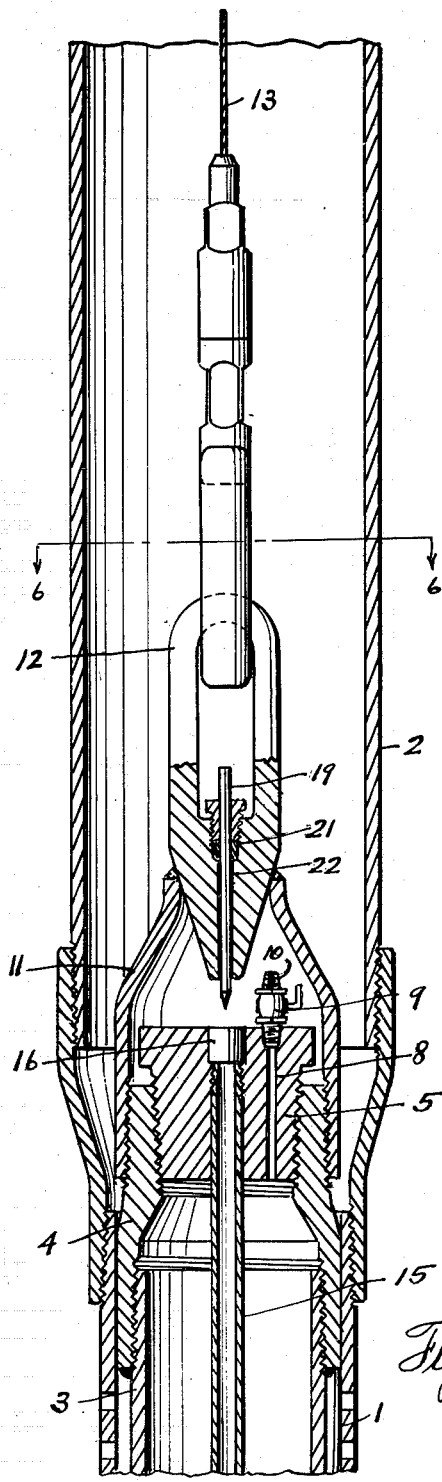
Figure 5 shows a fragmentary vertical sectional view showing a modified form of the apparatus for firing the charge, and, Figure 6 shows a cross-sectional view taken on the line 6—6 of Figure 5.
Figure 6:
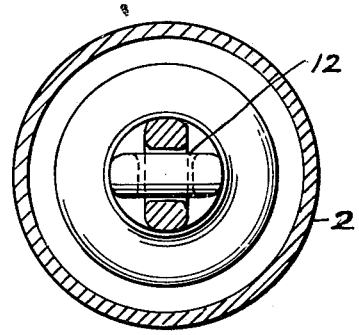

In the form shown in Figure 5, a coupling 11 is attached to the upper end of the nipple 4, and the jars 12 are secured to said coupling. The cable 13 is attached to the jars in the usual manner and when this form of the device is used, it may be let down into the well by said cable.

The nipple 4 and the guide 6 fit rather closely within the screen 1 and confine the force of the explosion to a radial direction through the screen. The container is preferably provided with external longitudinal ribs 14 which serve to center the container relative to the screen.

Depending from the plug 5 and anchored thereto, there is a primer tube 15 containing powder or any other suitable priming charge, and at the upper end of the tube 15, and located within the plug 5, there is a percussion cap 16. Anchored to the upper end of the plug 5 of the form shown in Figure 1, there is a tubular housing 17 whose upper end has a stuffing box 18 secured thereto and a firing pin 19 is fitted therethrough and gripped by the stuffing box 18 and extends down into the housing 17 with its lower end pointed and spaced above the cap 16.

When the apparatus shown in Figure 1 is in position in the screen, an object such as a metal ball 20 may be dropped through the tubing 7 and will strike the pin 19 and drive it downwardly against the cap 16 and explode said cap and charge in the tube 15.

In the form shown in Figure 5, the firing pin 19 is fitted through and clamped by the stuffing box 21 in the lower end of the jars, and this pin works through a vertical bearing 22, in said jars with its lower end pointed and spaced above the cap 16. In this form, when the apparatus is in position in the screen, or well, the tension on the cable 13 may be released and the upper link of the jar will drop down and strike the firing pin 19 and explode said cap to fire the charge in the tube 15.

When the priming charge is fired, the tube 15 will be disrupted and the main charge in the container 3 will be ignited causing an explosion. The container 3 also may have external, lengthwise grooves 23 arranged therearound, and when the main charge is exploded, this container will be split along the weakened grooves or lines 23, and the force of the explosion will cause the disrupted container to strike the inside of the screen with a sudden impact and will jar loose the clogged material and the expanding gases will be expanded outwardly in a radial direction through the well screen on all sides, thus forcing out the clogging material that may have collected on and in the screen, the vibration and expanding gas also breaking up the packed formation around the screen, or the packed walls of the bore in case a screen is not used, to permit the free inflow of oil into the screen, or bore.

The tubing 15 will thus be disrupted but the wall of the container 3 will serve as a shield to break the force of the explosion and to protect the screen to the end that the screen will not be injured or destroyed by the force of the explosion.

It may be here noted that the explosive charge will be forced into the container through the valve 9, and said valve closed before the container is attached to the tubing 7, or to the coupling 11, as the case may be.

The apparatus, however, after the explosion will retain its identity as a unitary structure and will not be dismembered or destroyed and may be withdrawn as a unit by means of the tubing 7 or the cable 13, as the case may be, so as not to thereafter clog the screen or prevent the free inflow of fluid.

The drawings and description disclose what is now considered to be a preferred form of the invention by way of illustration only, while the broad principle of the invention will be defined by the appended claims.

What I claim is:

1. Apparatus for cleaning a well screen in a well bore including an elongated tubular container having a closed chamber containing an explosive charge, said container being weakened along substantially longitudinal lines extending from end to end of the container, a primer container in said chamber, having a primer charge therein, a percussion cap arranged to fire said primer charge, a supporting tube for lowering the container into said screen, said cap being located so as to be fired by an impact member dropped through said tubing.

2. Apparatus for cleaning clogged well screens by vibration including a container having a chamber for an explosive charge, said container being shaped to be insertable into a screen in a well bore, a supporting tube to which the container is attached, a primer container in said chamber having a percussion cap exposed to the interior of said tube, said container being weakened along substantially longitudinal lines, and an impact member adapted to work through said tube and to effect the explosion of the cap.

3. Apparatus for unclogging the walls of a clogged well bore including an elongated container, weakened along lengthwise lines, approximately from end to end, having a valve controlled inlet opening through which a charge of gas, expansible upon ignition thereof may be introduced under pressure into said container, tubular means for lowering said container into a well bore, and means for igniting said charge.

4. Apparatus for unclogging the walls of a clogged well bore including an elongated container weakened along lines approximately from end to end and having a valve controlled inlet opening through which a charge of gas, expansible upon ignition thereof, may be introduced under pressure into said container, means for lowering said container into a well bore and means for igniting the charge.

5. Apparatus for unclogging the walls of a clogged well, comprising a container shaped to be lowered into a well and having external, longitudinal ribs and being weakened along longitudinal lines, means for lowering the container into the well, means at the upper end of the container and enclosed by said lowering means and through which an explosive charge may be introduced into the container.

IRA A. MORRIS.